United States Patent
Spinks et al.

(10) Patent No.: US 10,808,786 B2
(45) Date of Patent: Oct. 20, 2020

(54) HYBRID SPRING

(71) Applicant: Harrison Spinks Components Limited, West Yorkshire (GB)

(72) Inventors: Simon Paul Spinks, North Yorkshire (GB); David Clare, South Yorkshire (GB)

(73) Assignee: HARRISON SPINKS COMPONENTS LIMITED, Leeds, West Yorkshire (GB)

( * ) Notice: Subject to any disclaimer, the term of this patent is extended or adjusted under 35 U.S.C. 154(b) by 0 days.

(21) Appl. No.: 14/351,060

(22) PCT Filed: Oct. 10, 2012

(86) PCT No.: PCT/GB2012/052503
§ 371 (c)(1),
(2) Date: Apr. 10, 2014

(87) PCT Pub. No.: WO2013/054104
PCT Pub. Date: Apr. 18, 2013

(65) Prior Publication Data
US 2014/0250602 A1    Sep. 11, 2014

(30) Foreign Application Priority Data
Oct. 11, 2011 (GB) .................................. 1117487.7

(51) Int. Cl.
*F16F 3/04* (2006.01)
*A47C 23/043* (2006.01)
(Continued)

(52) U.S. Cl.
CPC .................. *F16F 3/04* (2013.01); *A47C 7/34* (2013.01); *A47C 7/40* (2013.01); *A47C 23/0438* (2013.01); *A47C 27/065* (2013.01)

(58) Field of Classification Search
CPC .. A47C 23/00; A47C 7/34; A47C 7/40; A47C 25/00; F16F 1/06; F16F 3/04
(Continued)

(56) References Cited

U.S. PATENT DOCUMENTS 274,715 A * 3/1883 Buckley ................ B21F 35/003
                                                213/40 S
380,651 A    4/1888 Fowler et al.
(Continued)

FOREIGN PATENT DOCUMENTS

CA    2225304 A1    6/1998
CN    2903019 Y     5/2007
(Continued)

OTHER PUBLICATIONS

International Preliminary Report on Patentability dated Apr. 15, 2014 in connection with International Patent Application No. PCT/GB12/052503, 8 pages.
(Continued)

*Primary Examiner* — Peter M. Cuomo
*Assistant Examiner* — Ifeolu A Adeboyejo
(74) *Attorney, Agent, or Firm* — Gesmer Updegrove LLP

(57) ABSTRACT

A complex spring unit (10) comprises at least a first spring portion (12) and a second spring portion (14), which first and second spring portions are integrally formed, wherein the first spring portion is arranged in use to be placed under compression, and the second spring portion is arranged in use to be placed under tension, during compression of the complex spring unit.

17 Claims, 1 Drawing Sheet

(51) Int. Cl.
  *A47C 27/06* (2006.01)
  *A47C 7/34* (2006.01)
  *A47C 7/40* (2006.01)

(58) Field of Classification Search
  USPC .............................. 267/85, 166, 180; 5/716
  See application file for complete search history.

(56) References Cited

U.S. PATENT DOCUMENTS

| | | | |
|---|---|---|---|
| 653,155 A * | 7/1900 | Tilden | F16F 1/046 |
| | | | 267/180 |
| 1,480,796 A | 1/1924 | Van Orman | |
| 1,531,547 A | 3/1925 | Edelson et al. | |
| 1,561,468 A | 11/1925 | Jordan et al. | |
| 1,852,943 A | 4/1932 | Swanson | |
| 1,896,670 A | 2/1933 | Garst | |
| 1,915,264 A | 6/1933 | Schneider et al. | |
| 1,963,053 A * | 6/1934 | Powers | A47C 23/0438 |
| | | | 267/272 |
| 1,963,054 A * | 6/1934 | Powers | A47C 23/0438 |
| | | | 267/286 |
| 2,114,008 A | 4/1938 | Wunderlich | |
| 2,250,042 A * | 7/1941 | Sundt | H01R 13/562 |
| | | | 16/108 |
| 2,276,002 A | 3/1942 | Török | |
| 2,388,106 A | 10/1945 | Woller | |
| 2,461,062 A | 2/1949 | Kane | |
| 2,716,308 A | 8/1955 | Hodges, Jr. | |
| 3,073,565 A * | 1/1963 | Daumy | F16K 31/44 |
| | | | 185/45 |
| 3,319,447 A | 5/1967 | Wise | |
| 3,355,747 A | 12/1967 | Ross | |
| 3,462,779 A | 8/1969 | Thompson | |
| 4,018,956 A | 4/1977 | Casey | |
| 4,077,619 A * | 3/1978 | Borlinghaus | F16F 1/08 |
| | | | 267/166 |
| 4,109,443 A | 8/1978 | Findlay | |
| 4,111,407 A | 9/1978 | Stager | |
| 4,160,544 A * | 7/1979 | Higgins | A47C 23/043 |
| | | | 267/100 |
| 4,365,767 A | 12/1982 | Benthimere | |
| 4,397,453 A * | 8/1983 | Seecamp | F41A 9/70 |
| | | | 267/166.1 |
| 4,439,977 A | 4/1984 | Stumpf | |
| 4,485,506 A | 12/1984 | Stumpf et al. | |
| 4,529,848 A * | 7/1985 | Cherry | H03K 17/98 |
| | | | 200/276.1 |
| 4,549,323 A | 10/1985 | Brockhaus | |
| 4,711,067 A | 12/1987 | Magni et al. | |
| 4,733,036 A * | 3/1988 | Koizumi | H01H 13/705 |
| | | | 200/276.1 |
| 4,809,375 A | 3/1989 | Bull | |
| 4,881,393 A | 11/1989 | Sykes | |
| 4,961,982 A | 10/1990 | Taylor | |
| 4,986,634 A | 1/1991 | Horikawa et al. | |
| 5,023,970 A | 6/1991 | Tesch | |
| 5,127,635 A | 7/1992 | Long et al. | |
| 5,311,624 A | 5/1994 | Hutchinson | |
| 5,425,531 A * | 6/1995 | Perrault | F16F 1/046 |
| | | | 267/166.1 |
| 5,438,718 A | 8/1995 | Kelly et al. | |
| 5,467,489 A | 11/1995 | Cchen | |
| 5,488,746 A | 2/1996 | Hudson | |
| 5,501,317 A | 3/1996 | Sommer et al. | |
| 5,503,375 A * | 4/1996 | Balsells | F16F 1/045 |
| | | | 267/167 |
| 5,669,093 A | 9/1997 | Ogle et al. | |
| 5,791,638 A * | 8/1998 | Balsells | F16F 3/04 |
| | | | 267/167 |
| 5,878,998 A * | 3/1999 | Hsieh | F16F 1/08 |
| | | | 267/166.1 |
| 5,885,407 A | 3/1999 | Mossbeck | |
| 5,957,438 A | 9/1999 | Workman et al. | |
| 5,966,759 A | 10/1999 | Sanders et al. | |
| 5,987,668 A | 11/1999 | Ackley | |
| 6,036,181 A | 3/2000 | Workman | |
| 6,049,959 A | 4/2000 | Grondahl | |
| 6,085,397 A | 7/2000 | Workman et al. | |
| 6,159,319 A | 12/2000 | Mossbeck | |
| 6,173,464 B1 | 1/2001 | McCune et al. | |
| 6,175,997 B1 | 1/2001 | Mossbeck | |
| 6,220,586 B1 * | 4/2001 | Pavlin | B21F 35/003 |
| | | | 267/155 |
| 6,260,223 B1 | 7/2001 | Mossbeck et al. | |
| 6,260,331 B1 | 7/2001 | Stumpf | |
| 6,341,767 B1 | 1/2002 | Seale et al. | |
| 6,397,418 B1 | 6/2002 | Stjerna | |
| 6,398,199 B1 | 6/2002 | Barber | |
| 6,574,811 B1 | 6/2003 | Mossbeck | |
| 6,631,529 B1 | 10/2003 | Erickson | |
| 6,684,608 B2 | 2/2004 | Gibbons | |
| 6,688,457 B2 * | 2/2004 | Haubert | B21F 3/027 |
| | | | 198/470.1 |
| 6,718,726 B1 | 4/2004 | Kuchel et al. | |
| 6,922,895 B1 | 8/2005 | Whitworth | |
| 6,931,685 B2 | 8/2005 | Kuchel et al. | |
| 7,100,862 B2 | 9/2006 | Skarzenski et al. | |
| 7,178,187 B2 * | 2/2007 | Barman | A47C 23/043 |
| | | | 267/166.1 |
| 7,850,153 B2 | 12/2010 | Bock | |
| 7,877,964 B2 | 2/2011 | Spinks et al. | |
| 7,997,397 B2 * | 8/2011 | Akiyoshi | F16D 41/067 |
| | | | 192/45.019 |
| 8,011,046 B2 | 9/2011 | Stjerna | |
| 8,087,114 B2 | 1/2012 | Lundevall | |
| 8,167,285 B2 * | 5/2012 | Balsells | F16B 21/18 |
| | | | 267/1.5 |
| 8,266,745 B2 | 9/2012 | Mossbeck | |
| 8,307,523 B2 | 11/2012 | Mossbeck et al. | |
| 8,382,653 B2 * | 2/2013 | Dubi | A61B 17/00234 |
| | | | 267/154 |
| 2002/0124321 A1 | 9/2002 | Wells | |
| 2002/0124531 A1 | 9/2002 | Mossbeck et al. | |
| 2004/0070128 A1 * | 4/2004 | Balsells | F16F 1/045 |
| | | | 267/180 |
| 2004/0103618 A1 | 6/2004 | De Santis et al. | |
| 2004/0206051 A1 | 10/2004 | Gecic et al. | |
| 2005/0007441 A1 | 1/2005 | Hyuga | |
| 2005/0055778 A1 | 3/2005 | Kuchel et al. | |
| 2005/0224626 A1 | 10/2005 | Pfeifer | |
| 2005/0257883 A1 | 11/2005 | Anagnostopoulos | |
| 2006/0075567 A1 | 4/2006 | DeFranks | |
| 2006/0236462 A1 | 10/2006 | Boyd | |
| 2006/0272098 A1 | 12/2006 | Hochschild | |
| 2006/0272928 A1 | 12/2006 | Kritzinger | |
| 2007/0022540 A1 | 2/2007 | Hochschild | |
| 2007/0199155 A1 | 8/2007 | Thygsen | |
| 2007/0216076 A1 * | 9/2007 | Ahn | A47C 23/00 |
| | | | 267/180 |
| 2007/0235915 A1 * | 10/2007 | Ahn | A47C 27/056 |
| | | | 267/167 |
| 2007/0256246 A1 | 11/2007 | Gladney et al. | |
| 2008/0054688 A1 | 3/2008 | Longnecker | |
| 2008/0189824 A1 | 8/2008 | Rock et al. | |
| 2008/0246197 A1 | 10/2008 | Mossbeck et al. | |
| 2009/0079113 A1 | 3/2009 | Martin | |
| 2009/0266032 A1 | 10/2009 | Spinks et al. | |
| 2010/0326012 A1 | 12/2010 | Blunschi | |
| 2011/0209514 A1 | 9/2011 | Huon | |
| 2012/0112396 A1 * | 5/2012 | DeFranks | F16F 1/04 |
| | | | 267/180 |
| 2012/0260422 A1 | 10/2012 | Rock et al. | |
| 2013/0334747 A1 | 12/2013 | Spinks | |
| 2014/0033440 A1 | 2/2014 | Tyree | |
| 2014/0033441 A1 | 2/2014 | Morgan et al. | |
| 2015/0026893 A1 | 1/2015 | Garrett et al. | |
| 2015/0084251 A1 * | 3/2015 | Ahn | A47C 23/0438 |
| | | | 267/180 |
| 2016/0354820 A1 | 12/2016 | Katou | |
| 2017/0008756 A1 | 1/2017 | Clare et al. | |
| 2017/0340130 A1 | 11/2017 | Mossbeck | |

(56) References Cited

U.S. PATENT DOCUMENTS

FOREIGN PATENT DOCUMENTS

| | | |
|---|---|---|
| CN | 101140019 A | 3/2008 |
| CN | 201777876 U | 3/2011 |
| CN | 201890767 U | 7/2011 |
| CN | 202112703 U | 1/2012 |
| CN | 203740239 U | 7/2014 |
| DE | 899008 C | 12/1953 |
| DE | 3143269 A1 | 5/1983 |
| DE | 3514042 A1 | 10/1986 |
| DE | 4225147 A1 | 9/1993 |
| DE | 4419206 C1 | 3/1995 |
| DE | 19529911 A1 | 2/1997 |
| DE | 10244766 A1 | 5/2003 |
| DE | 102008061465 B3 | 8/2009 |
| EP | 0089789 A1 | 9/1983 |
| EP | 252211 A2 | 1/1988 |
| EP | 0359035 A1 | 3/1990 |
| EP | 0401318 A1 | 12/1990 |
| EP | 0558078 A1 | 9/1993 |
| EP | 0899034 A2 | 3/1999 |
| EP | 0941962 A1 | 9/1999 |
| EP | 0943445 A2 | 9/1999 |
| EP | 1993947 A1 | 11/2008 |
| EP | 1993947 B1 | 3/2014 |
| FR | 2171782 A5 | 9/1973 |
| FR | 2561620 A1 | 9/1985 |
| FR | 2606756 A1 | 5/1988 |
| FR | 2780624 A1 | 1/2000 |
| GB | 947298 A | 1/1964 |
| GB | 1461671 A | 1/1977 |
| GB | 2056336 A | 3/1981 |
| GB | 2437825 A | 11/2007 |
| GB | 2477139 A | 7/2011 |
| GB | 2488214 A | 8/2012 |
| GB | 2537854 A | 11/2016 |
| JP | S5157452 U | 5/1976 |
| JP | 56090136 A | 7/1981 |
| JP | S60165121 U | 11/1985 |
| JP | S6134950 U | 3/1986 |
| JP | S6155867 U | 4/1986 |
| JP | 59212545 A | 10/1989 |
| JP | 2001340175 A | 12/2001 |
| KR | 101008136 B1 | 6/2005 |
| SU | 846007 A1 | 7/1981 |
| WO | 9530622 A1 | 11/1995 |
| WO | 9617701 A1 | 6/1996 |
| WO | 9635637 A1 | 11/1996 |
| WO | 9956591 A1 | 11/1999 |
| WO | 0126507 A1 | 4/2001 |
| WO | 0145875 A1 | 6/2001 |
| WO | 03027840 A1 | 4/2003 |
| WO | 03035304 A1 | 5/2003 |
| WO | 03036874 A2 | 5/2003 |
| WO | 2004099004 A1 | 11/2004 |
| WO | 2006043862 A1 | 4/2006 |
| WO | 2007031774 A1 | 3/2007 |
| WO | 2007102772 A1 | 9/2007 |
| WO | 2009030017 A1 | 3/2009 |
| WO | 2009111801 A2 | 9/2009 |
| WO | 2010026477 A2 | 3/2010 |
| WO | 2011142549 A2 | 11/2011 |
| WO | 2011142549 A3 | 11/2011 |
| WO | 2013054104 A1 | 4/2013 |
| WO | 2014113737 A1 | 7/2014 |
| WO | 2015087557 A1 | 6/2015 |
| WO | 2015114361 A1 | 8/2015 |
| WO | 2018220366 A1 | 12/2018 |

OTHER PUBLICATIONS

"Fold," Mirriam-Webster.com, Merriam-Webster, n.d. Wednesday, Jan. 29, 2018, 1 page.
International Preliminary Report on Patentability issued by the International Bureau of WIPO dated Jan. 15, 2013 in related International Application No. PCT/GB2011/052169, 14 pages.
Non-Final Office Action issued by the U.S. Patent and Trademark Office dated Aug. 7, 2015 in related U.S. Appl. No. 13/884,049, 8 pages.
Final Office Action issued by the U.S. Patent and Trademark Office dated Apr. 27, 2016 in related U.S. Appl. No. 13/884,049, 9 pages.
Non-Final Office Action issued by the U.S. Patent and Trademark Office dated Nov. 10, 2016 in related U.S. Appl. No. 13/884,049, 6 pages.
Final Office Action issued by the U.S. Patent and Trademark Office dated May 4, 2017 in related U.S. Appl. No. 13/884,049, 8 pages.
Non-Final Office Action issued by the U.S. Patent and Trademark Office dated Jan. 30, 2018 in related U.S. Appl. No. 13/884,049, 5 pages.
International Preliminary Report on Patentability issued by the International Bureau of WIPO dated Feb. 10, 2015 in related International Application No. PCT/GB2013/052131, 5 pages.
International Search Report and Written Opinion issued by the International Searching Authority dated Nov. 5, 2013 in related International Application No. PCT/GB2013/052131, 7 pages.
International Search Report and Written Opinion issued by the International Searching Authority dated Feb. 12, 2013 in related International Application No. PCT/GB2012/052503, 8 pages.
Non-Final Office Action issued by the U.S. Patent and Trademark Office dated Oct. 2, 2015 in related U.S. Appl. No. 14/420,690, 8 pages.
Final Office Action issued by the U.S. Patent and Trademark Office dated Jun. 24, 2016 in related U.S. Appl. No. 14/420,690, 9 pages.
Non-Final Office Action issued by the U.S. Patent and Trademark Office dated Jun. 27, 2017 in related U.S. Appl. No. 14/420,690, 18 pages.
Final Office Action issued by the U.S. Patent and Trademark Office dated Sep. 20, 2017 in related U.S. Appl. No. 14/420,690, 18 pages.
Non-Final Office Action issued by the U.S. Patent and Trademark Office dated Sep. 25, 2018 in related U.S. Appl. No. 14/420,690, 15 pages.
Final Office Action issued by the U.S. Patent and Trademark Office dated Jun. 4, 2019 in related U.S. Appl. No. 14/420,690, 21 pages.
Non-Final Office Action issued by the U.S. Patent and Trademark Office dated Dec. 20, 2019 in related U.S. Appl. No. 14/420,690, 12 pages.
International Search Report and Written Opinion issued by the International Searching Authority in related International Application No. PCT/GB2011/052169 dated Jan. 16, 2012, 6 pages.
Search Report issued by British Intellectual Property Office in related British Patent Application No. 1214312.9 dated Nov. 6, 2012, 6 pages.
International Preliminary Report on Patentability issued by the International Bureau of WIPO dated Feb. 10, 2015 in related International Application No. PCT/GB2013/052129, 4 pages.
International Search Report and Written Opinion issued by the International Searching Authority dated Dec. 5, 2013 in related International Application No. PCT/GB2013/052129, 6 pages.
Non-Final Office Action issued by the U.S. Patent and Trademark Office dated Mar. 6, 2017 in related U.S. Appl. No. 14/420,692, 9 pages.
Final Office Action issued by the U.S. Patent and Trademark Office dated Sep. 20, 2017 in related U.S. Appl. No. 14/420,692, 8 pages.
Search Report issued by British Intellectual Property Office in related Brittish Patent Application No. 1214305.3 dated Nov. 28, 2012, 3 pages.
International Preliminary Report on Patentability issued by the International Bureau of WIPO in related International Application No. PCT/GB2013/052130 dated Feb. 10, 2015, 5 pages.
International Search Report and Written Opinion issued by the International Searching Authority in related International Application No. PCT/GB2013/052130 dated Nov. 27, 2013, 7 pages.
Non-Final Office Action issued by the U.S. Patent and Trademark Office in related U.S. Appl. No. 14/420,691 dated Jun. 23, 2015, 4 pages.

(56) References Cited

OTHER PUBLICATIONS

Search Report issued by British Intellectual Property Office in related British Patent Application No. 1214314.5 dated Nov. 9, 2012, 4 pages.
International Preliminary Report on Patentability issued by the International Bureau of WIPO in related International Application No. PCT/GB2015/050235 dated Aug. 2, 2016, 11 pages.
International Search Report and Written Opinion issued by the International Searching Authority in related International Application No. PCT/GB2015/050235 dated Sep. 5, 2013, 14 pages.
Non-Final Office Action issued by the U.S. Patent and Trademark Office dated Sep. 11, 2018 in related U.S. Appl. No. 15/115,451, 10 pages.
Final Office Action issued by the U.S. Patent and Trademark Office dated Apr. 11, 2019 in related U.S. Appl. No. 15/115,451, 9 pages.
Non-Final Office Action issued by the U.S. Patent and Trademark Office dated Jan. 30, 2020 in related U.S. Appl. No. 15/115,451, 10 pages.
International Preliminary Report on Patentability issued by the International Bureau of WIPO in related International Application No. PCT/GB2015/050236 dated Aug. 2, 2016, 7 pages.
International Search Report and Written Opinion issued by the International Searching Authority in related International Application No. PCT/GB2015/050236 dated Apr. 20, 2015, 10 pages.
Search Report issued by British Intellectual Property Office in related British Patent Application No. 1401597.8 dated Oct. 8, 2014, 5 pages.
Non-Final Office Action issued by the U.S. Patent and Trademark Office dated Dec. 7, 2018 in related U.S. Appl. No. 15/115,460, 9 pages.
Final Office Action issued by the U.S. Patent and Trademark Office dated Jun. 4, 2019 in related U.S. Appl. No. 15/115,460, 11 pages.
Search Report issued by British Intellectual Property Office in related British Patent Application No. 1401606.7 dated Jul. 24, 2014, 3 pages.
International Preliminary Report on Patentability issued by the International Bureau of WIPO in related International Application No. PCT/GB2018/051465 dated Dec. 3, 2019, 14 pages. International Preliminary Report on Patentability issued by the International Bureau of WIPO in related
International Preliminary Report on Patentability issued by the International Bureau of WIPO in related International Application No. PCT/GB2018/052278 dated Feb. 18, 2020, 9 pages.
International Search Report and Written Opinion issued by the International Searching Authority in related International Application No. PCT/GB2018/052278 dated Apr. 10, 2019, 11 pages.
International Search Report and Written Opinion issued by the International Searching Authority in related International Application No. PCT/GB2018/051465 dated Mar. 22, 2019, 20 pages.
International Preliminary Report on Patentability issued by the International Bureau of WIPO in related International Application No. PCT/GB2018/052279 dated Feb. 18, 2020, 5 pages.
International Search Report and Written Opinion issued by the International Searching Authority in related International Application No. PCT/GB2018/052279 dated Nov. 9, 2018, 7 pages.
Search Report issued by British Intellectual Property Office in related Brittish Patent Application No. 1713098.0 dated Feb. 6, 2019, 2 pages.
Search Report issued by British Intellectual Property Office in related British Patent Application No. 1708639.8 dated Nov. 22, 2017, 5 pages.
Search Report issued by British Intellectual Property Office in related British Patent Application No. 1713096.4 dated Feb. 11, 2019, 2 pages.

* cited by examiner

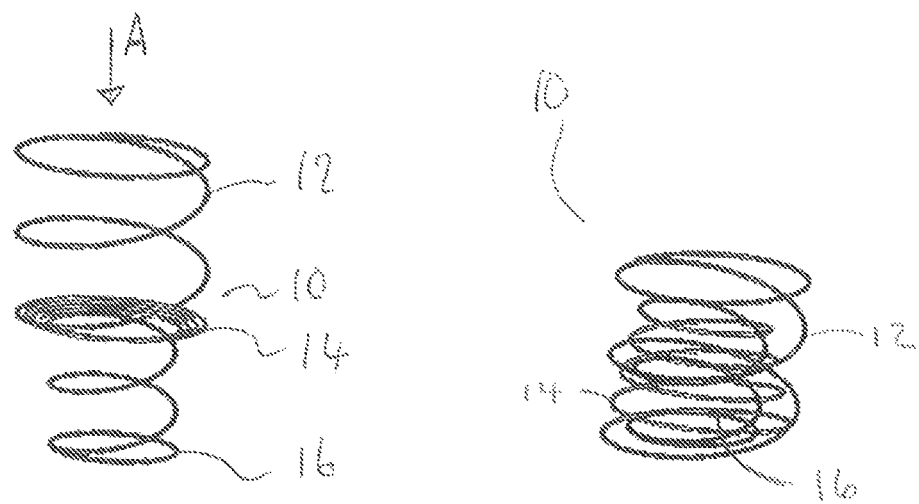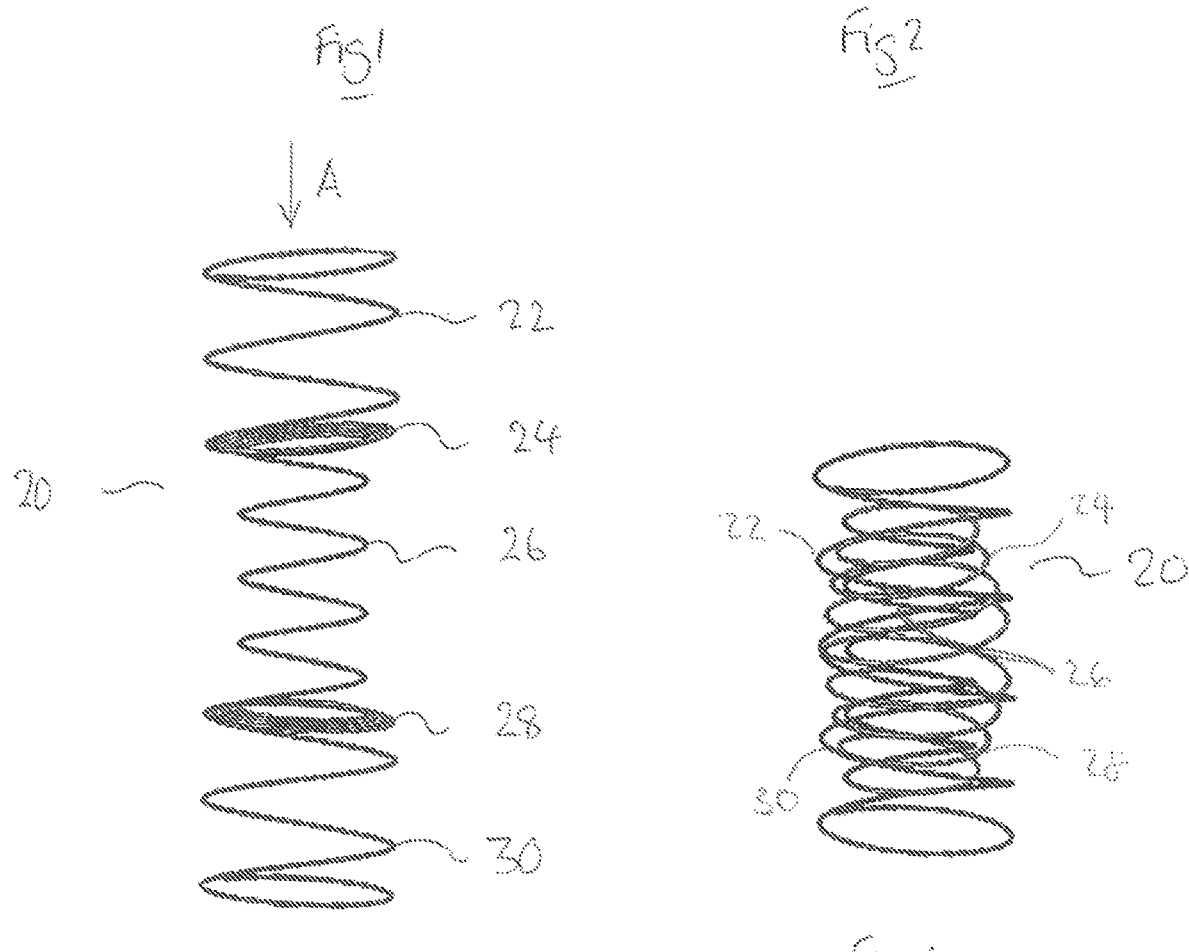

HYBRID SPRING

PRIORITY INFORMATION

The present invention is a U.S. National Stage filing under 35 U.S.C. 371(c) of International Application No. PCT/GB2012/052503 filed Oct. 10, 2012, which claims priority to United Kingdom Patent Application No. 1117487.7, filed on Oct. 11, 2011, all of which are incorporated herein by reference in their entireties.

The present invention relates to springs, such as can be used in a resilient pad or panel, cushion or mattress.

It is well known in the art to incorporate springs, such as individually pocketed springs, in a mattress to provide comfort and resilience. In previously considered mattresses, the springs typically comprise a helically wound coil of wire, such as steel.

Generally, the greater the number of individual coils that are employed in a mattress, the greater the level of comfort is afforded to the user. Furthermore the prior art has seen various attempts to alter the characteristic of a complex spring unit by combining springs of different size or stiffness. A single spring, operating within its limits, has a simple compression characteristic. This can be improved by combining springs, but this is often inefficient in materials and therefore expensive.

The steel used for the springs is an increasingly expensive commodity and manufacturers have become increasingly reluctant to add to the mass of steel used in a mattress for example. One way to reduce the mass of a spring is to use wire of a lesser—ie thinner—gauge. But reducing the gauge of the wire for a given number of turns will undesirably reduce the stiffness of the spring.

One prior approach is disclosed in JP 59212545 A in which a spring unit comprises discrete inner and outer coils which are made to engage each other by a hook arrangement, in order to provide the spring unit with a non-linear characteristic.

CN 101140019 discloses a multi stage compression spring unit formed by three separate compression springs of equal stiffness but decreasing diameter, all of which are secured to the same base.

FR 2 780 624 describes a complex spring unit having three discrete springs arranged co-axially to provide an allegedly progressive characteristic.

GB 2 437 825 describes a spring unit having three integrally formed co-axial compression springs, wherein the second and third springs have diameters which reduce from one end to the other.

Embodiments of the present invention aim to provide a spring unit which uses material efficiently. Embodiments of the present invention also aim to provide a spring unit which provides an improved spring characteristic.

The present invention is defined in the attached independent claims, to which reference should now be made. Further, preferred features may be found in the sub-claims appended thereto.

According to the invention there is provided a complex spring unit comprising at least a first spring portion and a second spring portion, which first and second spring portions are integrally formed, wherein the first spring portion is arranged in use to be placed under compression, and the second spring portion is arranged in use to be placed under tension, during compression of the complex spring unit.

In a preferred arrangement the complex spring unit comprises a third integrally formed spring portion, which third spring portion is arranged in use to be placed under compression during compression of the complex spring unit.

The complex spring unit may comprise a fourth integrally formed spring portion, which fourth spring portion is arranged in use to be placed under tension during compression of the complex spring unit.

The complex spring unit may comprise a fifth integrally formed spring portion, which fifth spring portion is arranged in use to be placed under compression during compression of the complex spring unit.

The second spring portion is preferably continuous with the first spring portion. The third spring portion is preferably continuous with the second spring portion. The fourth spring portion is preferably continuous with the third spring portion. The fifth spring portion is preferably continuous with the fourth spring portion.

The second and/or fourth spring portions may comprise coiled tension springs. The second spring portion and/or the fourth spring portion may be arranged to be substantially flat in a relaxed configuration.

Preferably, during compression of the complex spring unit, at least some of the spring portions become deformed at different stages to other spring portions.

In a preferred arrangement the complex spring unit comprises the first, second and third spring portions and is arranged such that during compression of the complex spring unit the spring portions become elastically deformed according to the following phases:
  a) A first phase comprising solely or mainly of deformation of the second spring portion and
  b) A second phase comprising solely or mainly of deformation of the first spring portion.

The complex spring unit may be arranged such that during compression the spring portions become deformed according to a third phase comprising solely or mainly of deformation of the first and third spring portions.

The complex spring unit may be arranged such that during one phase of compression the second spring portion comes out of tension.

The complex spring unit may comprise the first, second, third, fourth and fifth spring portions, and may be arranged such that during compression of the complex spring unit the spring portions become elastically deformed according to the following phases:
  a) A first phase comprising solely or mainly of deformation of the second and fourth spring portions; and
  b) A second phase comprising solely or mainly of deformation of the first and fifth spring portions.

The complex spring unit may be arranged such that, during compression the spring portions become deformed according to a third phase comprising solely or mainly of deformation of the first, third and fifth spring portions.

The deformation of the second and/or fourth spring portions may comprise substantially only extension under tension. Alternatively, the deformation of the second and/or fourth spring portion may include compression under relaxation.

The complex spring unit may be arranged within a sleeve or pocket, and may be pre-compressed within the sleeve or pocket.

The invention also includes a resilient pad or panel, cushion or mattress or upholstered unit, incorporating a complex spring unit according to any statement herein.

The pad or panel may comprise a mattress, seat, seat back, mat or upholstered unit and compression of the pad or panel may be in a generally through-thickness direction. The complex spring unit may be generally conical.

The invention may include any combination of the features or limitations referred to herein, except a combination of features as are mutually exclusive.

A preferred embodiment of the present invention will now be described, with reference to the accompanying diagrammatic drawings in which:

FIG. 1 shows schematically a first embodiment of complex spring unit, in a first, relaxed or uncompressed state;

FIG. 2 shows the complex spring unit of FIG. 1 in a second, partially compressed state;

FIG. 3 shows a second embodiment of complex spring unit in a first, relaxed or uncompressed state; and FIG. 4 shows the complex spring unit of FIG. 4 in a second, partially compressed state.

Turning to FIG. 1, this shows, generally at 10, a complex spring unit according to an embodiment of the invention.

The complex spring unit 10 is made up of three distinct spring portions as follows: a first spring portion 12 comprises a substantially helical coil spring of a first, generally constant diameter, a second spring portion 14 comprises a substantially flat coil spring having turns that decrease in diameter, and a third spring portion 16 comprises a substantially helical coil spring of a second, generally constant diameter, which is less than the first diameter. The three spring portions are formed integrally from a single length of steel wire.

The complex spring unit 10 may be used in a resilient pad or panel or in a mattress or other upholstered article (not shown). The unit 10 may be encapsulated completely or partly in a pocket or sleeve.

When the complex spring unit becomes compressed, by applying pressure axially downward upon the spring in the direction shown by arrow A, when the unit 10 presses against a base (not shown), the unit 10 becomes deformed in phases or stages, because of the distinct constituent spring portions 12, 14 and 16. Initially, a first phase of deformation involves mainly or solely the extension of the second spring portion 14 as the lowermost turn 12a of the spring portion 12 pushes down upon the outermost turn of the second spring portion 14. At the end of this first phase, the second spring portion is at maximum extension, as is shown in FIG. 2.

The next phase of compression of the complex spring portion sees the first spring portion 12 begin to deform under compression. Finally, as compression of the complex spring unit 10 continues the third spring portion 16 also begins to deform under compression. In the limit of compression of complex spring unit 10 (not shown) the unit 10 can become compressed to a substantially flat configuration, though it would not normally be the intention to compress the unit to such an extent in use. During the final phase of compression the second spring portion may relax and come out of tension.

FIG. 3 shows an alternative embodiment of complex spring unit 20 which amounts to a pair of units 10 arranged back to back, although the spring units are again integrally formed from a single length of steel wire and the coils thereof are continuous. In the unit 20 there is a first spring unit 22 comprising a substantially helical coil spring of a first, generally constant diameter, a second spring portion 24 comprising a substantially flat coil spring having turns that decrease in diameter, a third spring portion 26 comprising a substantially helical coil spring of a second, generally constant diameter, which is less than the first diameter, a fourth spring portion 28 comprising another substantially flat coil spring having turns that decrease in diameter and a fifth spring portion 30 comprising another substantially helical coil spring of the second, generally constant diameter.

During compression of the complex spring unit 20, by a force acting in the direction of arrow A, the following phases occur: Firstly the spring portions 24 and 28 deform under tension. Secondly the first and fifth spring portions deform under compression, and finally the third spring portion 26 deforms under compression with the first and fifth spring portions. During a final phase of compression the second and fourth spring portions may relax and come out of tension.

FIG. 4 shows the complex spring unit of FIG. 3 in a partially compressed state.

By combining at least one spring portion that elastically extends under compression of the complex unit with at least one spring portion that elastically compresses under compression of the complex spring unit, the invention conveniently provides a phased spring characteristic. Since the spring portions are formed from a continuous length of wire, material is used efficiently, as there is no need to turn in the end coils of all of the spring portions as would be the case with separate springs. Furthermore, in the complex spring unit the distinct but integral spring portions interact and influence each other to provide a complex spring characteristic that allows for a greater comfort for the user, whilst requiring a lesser height of spring unit, as compared with a single compression spring. The resulting spring unit is also very stable.

The spring portions can be of different diameters according to the intended performance.

The complex spring unit according to the embodiments described above is relatively simple to manufacture using existing coil-forming technology, since the direction of coiling remains the same for the distinct but integral spring portions.

The complex spring unit according to the embodiments described above may also be combined with one or more springs or spring units of another type, for example by stacking or positioning side by side, in order to improve or at least vary the characteristic of the combined unit.

Whilst endeavouring in the foregoing specification to draw attention to those features of the invention believed to be of particular importance, it should be understood that the applicant claims protection in respect of any patentable feature or combination of features referred to herein, and/or shown in the drawings, whether or not particular emphasis has been placed thereon.

The invention claimed is:

1. A complex spring unit including first and second opposed ends, the unit comprising at least first and second co-axial coil spring portions integrally formed from coiled wire, wherein the first spring portion is helical and is arranged in use to be placed under compression during compression of the complex spring unit, and the second spring portion comprises a plurality of coils of differing diameters and is axially spaced from the first and second ends and arranged in use to be placed under tension during compression of the complex spring unit.

2. A complex spring unit according to claim 1, wherein the complex spring unit comprises a third integrally formed spring portion, which third spring portion is arranged in use to be placed under compression during compression of the complex spring unit.

3. A complex spring unit according to claim 2, wherein the complex spring unit comprises a fourth integrally formed spring portion, which fourth spring portion is arranged in use to be placed under tension during compression of the complex spring unit.

4. A complex spring unit according to claim 3, comprising a fifth integrally formed spring portion, which fifth spring portion is arranged in use to be placed under compression during compression of the complex spring unit.

5. A complex spring unit according to claim 1, wherein the second spring portion is continuous with the first spring portion.

6. A complex spring unit according to claim 2, wherein the third spring portion is continuous with the second spring portion.

7. A complex spring unit according to claim 1, wherein the second spring portion comprises a coiled tension spring.

8. A complex spring unit according to claim 1, wherein, during compression of the complex spring unit, at least some of the spring portions become deformed at different stages to other spring portions.

9. A complex spring unit according to claim 2, wherein the complex spring unit comprises the first, second and third spring portions and is arranged such that during compression of the complex spring unit the spring portions become elastically deformed according to the following phases:
   a) a first phase including deformation of the second spring portion and
   b) a second phase including deformation of the first spring portion.

10. A complex spring unit according to claim 9, wherein the complex spring unit is arranged such that during compression the spring portions become deformed according to a third phase comprising solely or mainly of deformation of the first and third spring portions.

11. A complex spring unit according to claim 10, wherein the complex spring unit is arranged such that during at least one phase of compression the second spring portion is relaxed.

12. A complex spring unit according to claim 4, wherein the complex spring unit comprises first, second, third, fourth and fifth spring portions, and is arranged such that during compression of the complex spring unit the spring portions become elastically deformed according to the following phases:
   a) a first phase comprising solely or mainly of deformation of the second and fourth spring portions; and
   b) a second phase comprising solely or mainly of deformation of the first and fifth spring portions.

13. A complex spring unit according to claim 12, wherein the complex spring unit is arranged such that, during compression the spring portions become deformed according to a third phase comprising solely or mainly of deformation of the first, third and fifth spring portions.

14. A complex spring unit according to claim 12, wherein the deformation of the second and/or fourth spring portions comprises only extension under tension.

15. A complex spring unit according to claim 12, wherein the complex spring unit is arranged within a sleeve or pocket.

16. A resilient pad or panel, cushion or mattress or upholstered unit, incorporating a complex spring unit according to claim 12.

17. A resilient pad or panel according to claim 16, wherein the pad or panel comprises a mattress, seat, seat back, mat or upholstered unit and compression of the pad or panel.

* * * * *